(12) United States Patent
Cunningham et al.

(10) Patent No.: US 8,959,695 B2
(45) Date of Patent: Feb. 24, 2015

(54) MICRO FILAMENT CLEANING TOOL FOR EMERGING OPTICAL CONNECTORS

(75) Inventors: Dave E. Cunningham, Conover, NC (US); Micah C. Isenhour, Lincolnton, NC (US); Dennis M. Knecht, Hickory, NC (US); James P. Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 382 days.

(21) Appl. No.: 13/036,217

(22) Filed: Feb. 28, 2011

(65) Prior Publication Data

US 2012/0216829 A1     Aug. 30, 2012

(51) Int. Cl.
*B08B 1/00* (2006.01)
*G02B 6/38* (2006.01)

(52) U.S. Cl.
CPC ............. *B08B 1/008* (2013.01); *G02B 6/3853* (2013.01); *G02B 6/3866* (2013.01); *G02B 6/3879* (2013.01)
USPC ............. 15/97.1; 15/210.1; 385/53; 385/134; 385/147

(58) Field of Classification Search
CPC .. B08B 1/0003; B08B 1/006; B08B 2240/02; G02B 6/3866
USPC .................. 15/97.1, 210.1; 385/53, 134, 147
See application file for complete search history.

(56) References Cited

U.S. PATENT DOCUMENTS

| | | | |
|---|---|---|---|
| 5,090,078 A * | 2/1992 | Kamakura et al. | 15/97.1 |
| 5,878,458 A * | 3/1999 | Higginbotham | 15/104.94 |
| 5,937,254 A * | 8/1999 | Maher et al. | 399/297 |
| 6,209,163 B1 * | 4/2001 | Clairadin et al. | 15/97.1 |
| 6,618,890 B2 * | 9/2003 | Muhr-Sweeney | 15/104.002 |
| 6,821,025 B2 | 11/2004 | Gerhard | 385/85 |
| 6,836,922 B2 * | 1/2005 | Weng | 15/210.1 |
| 6,853,794 B2 | 2/2005 | Lu et al. | 385/134 |
| 6,854,152 B2 * | 2/2005 | Loder et al. | 15/210.1 |
| 6,905,251 B2 * | 6/2005 | Fujiwara et al. | 385/53 |
| 7,147,386 B2 | 12/2006 | Zhang et al. | 385/85 |
| 7,215,864 B1 | 5/2007 | Qian et al. | 385/134 |
| 7,232,262 B2 | 6/2007 | Lytle et al. | 385/85 |
| 7,243,390 B2 * | 7/2007 | Fujiwara et al. | 15/97.1 |
| 7,566,176 B2 | 7/2009 | Lytle et al. | 385/85 |
| 7,971,304 B2 * | 7/2011 | Kida et al. | 15/97.1 |
| 8,335,464 B2 * | 12/2012 | Pickering et al. | 399/354 |
| 8,336,149 B2 * | 12/2012 | Blair et al. | 15/104.001 |
| 8,388,414 B2 * | 3/2013 | Endou et al. | 451/164 |
| 8,439,575 B2 * | 5/2013 | He et al. | 385/53 |

(Continued)

FOREIGN PATENT DOCUMENTS

EP          1038595 A2 *  9/2000  ............... B08B 1/00

*Primary Examiner* — Gary Graham
*Assistant Examiner* — Michael Jennings (57) ABSTRACT

A cleaning tool for cleaning internal optical components of a fiber optic connector includes a cleaning strip that is advanced past one or more optical surfaces of the connector to wipe the connector free of contaminants. The cleaning tool includes a drive mechanism that is operated by rotating a drive, thereby advancing the cleaning strip along a cleaning strip path and into contact with the one or more optical surfaces. The cleaning tool comprises a cleaning tip that functions to place the cleaning strip in proper alignment within the connector in order to clean the optical surfaces that are not available for cleaning at the endface of the connector. Alignment features are provided in the cleaning tip to properly position the cleaning strip relative the optical surfaces.

12 Claims, 10 Drawing Sheets

(56) References Cited

U.S. PATENT DOCUMENTS

| | | |
|---|---|---|
| 2003/0098045 A1* | 5/2003 | Loder et al. .................... 134/8 |
| 2003/0169991 A1* | 9/2003 | Malevanets et al. .......... 385/134 |
| 2004/0033050 A1* | 2/2004 | Lytle et al. .................... 385/147 |
| 2006/0191091 A1* | 8/2006 | Kida ............................. 15/210.1 |
| 2006/0193562 A1* | 8/2006 | Theuerkorn .................... 385/53 |
| 2007/0023067 A1* | 2/2007 | Kida et al. ..................... 134/6 |
| 2007/0056126 A1* | 3/2007 | Muhr-Sweeney ....... 15/104.001 |
| 2010/0199452 A1* | 8/2010 | Blair et al. .................... 15/210.1 |
| 2011/0297184 A1* | 12/2011 | Mahapatra et al. ............ 134/6 |

\* cited by examiner

MICRO FILAMENT CLEANING TOOL FOR EMERGING OPTICAL CONNECTORS

BACKGROUND

The present disclosure generally relates to connectors, and in particular to the cleaning and maintenance of optical connectors, and is particularly applicable to consumer electronic optical connectors.

The science of fiber optics is applicable to various fields of technology and is often applied to the transmission of communication signals. Individual optical fibers, which each act as a waveguide for directing light from one end of the fiber to the other, can be bundled together to form a fiber optic cable. As the use of fiber optics migrates into numerous consumer electronics applications, such as connecting computer peripherals (USB and Firewire cables for example), there will be a consumer driven expectation for cables having improved performance and a broad range of use and for cable connectors that are at least as reliable as traditional wire cable connectors. As a specific example, as the Intel® USB 4 connector design continues to mature, the ability to reach the optical surfaces in the connector is becoming increasingly difficult because they are buried deep within the connector and may be protected with shutters and other protective features.

Benefits of optical fiber include extremely wide bandwidth and low noise operation. Fiber optic networks often include separated interconnection points linking fiber optic cables and connecting such cables to devices to provide "live fiber" from one connection point to another connection point. For this purpose, fiber optic cables generally terminate in male and/or female connectors that can be coupled to the connectors of like fiber optic cables or to electronic equipment to complete and optical connection.

At the interconnections within the connectors, light exiting the core of the optical fiber or fibers of a cable is immediately introduced into a core of the optical fiber or fibers within an adjacent connected fiber optic connector. If two cores are misaligned, then much of the optical signal is not exchanged from the core of the first fiber optic cable to the core of the second fiber optic cable. This results in signal degradation at the interconnections. Furthermore, and more salient to the present disclosure, if a piece or pieces of debris is caught in either of the fiber optic connectors, then it is likely that little or no optical signal will be exchanged from the core of the first fiber cable to the core of the second fiber optic cable, particularly if the debris has a size that is approximately the same size or larger than the size of the terminating surfaces of the fiber optic cables within the connector. Unlike wire cable connectors, dust, dirt and other contaminants are a particular problem in optical connections because they interfere with the passage of light from one fiber to another and the information embedded in the light is not or is poorly transmitted. Fiber optic connectors must therefore be kept clean to ensure long life and to minimize transmission loss and optical return loss at connection points. A single dust particle caught between two connectors can cause significant signal loss. Dust particles as small as 1 micrometer ($\mu m$) in diameter at a connection point can significantly degrade performance. Particles 8 $\mu m$ in diameter or larger at a connection point can cause a complete failure of an optical system.

In addition, dust particles within optical connectors can scratch optical components, such as lens and mirrors, resulting in permanent damage. What is needed is a simple and reliable apparatus for cleaning and inspecting optical connectors, particularly in locations where the connectors are not easily accessible. What is also needed is a simple and inexpensive mechanical system to position a cleaning device close to a connector so the optical components of connector can be adequately aligned and cleaned. An additional need is for fiber optic connector cleaning options that work with the deeply buried, highly shrouded, and/or shuttered optical components within recent connector and receptacle designs. It is to these and other needs that the present disclosure is primarily directed.

SUMMARY

Briefly described, in one embodiment, is a cleaning tool for cleaning at least one surface within a consumer electronics connector. The cleaning tool comprises a hand-held body and a cleaning tip on the body. The cleaning tip has a distal end portion that is configured to be received by the connector and the distal end portion is configured to align the at least one optical surface with the cleaning tip. Alignment features are present within the distal end and cleaning tip to ensure the cleaning tip is properly aligned with the t least one optical surface. A strip of cleaning material is disposed in the tool and extends along a path that exposes the strip of cleaning material at the distal end portion of the cleaning tip. The exposed strip of cleaning material engages the at least one surface when the cleaning tip is received by the connector. The cleaning tool further comprises a mechanism for selectively advancing the strip of cleaning material along the path to wipe contaminates from the at least one surface when the cleaning tip is received by the connector.

Also disclosed is a method for cleaning at least one surface within a consumer electronics connector. The method comprises the steps of:
 (a) aligning an exposed section of a strip of cleaning material with the at least one surface;
 (b) engaging the at least one surface with an exposed section of a strip of cleaning material extending along a path;
 (c) selectively advancing the strip of cleaning material along the path to wipe the cleaning material across the at least one surface; and
 (d) removing the strip of cleaning material from the connector.

Additional features and advantages will be set forth in the detailed description which follows, and in part will be readily apparent to those skilled in the art from that description and the accompanying drawings, or recognized by practicing the embodiments described herein.

It is to be understood that both the foregoing summary and the following detailed description are merely exemplary of preferred embodiments, and are intended to provide an overview or framework to understanding the nature and character of the claims. The accompanying drawings are included to provide a further understanding, and are incorporated in and constitute a part of this disclosure. The drawings illustrate the exemplary embodiments, and together with the description serve to explain principles and operation of the various embodiments.

BRIEF DESCRIPTION OF THE DRAWINGS

The drawing figures emphasize the general principles of the present disclosure and are not necessarily drawn to scale. Reference characters designating corresponding components are repeated as necessary throughout the figures for the sake of consistency and clarity.

DETAILED DESCRIPTION

The present disclosure is directed to a cleaning tool having a cleaning tip for use with an electronic optical connector. Although disclosed primarily within the context of a cleaning tip and a cleaning system for a consumer electronic optical connector, and more specifically a USB optical connector, the skilled artisan will recognize that the principles of the present disclosure are not so limited but extend to any type of fiber optic connector susceptible to dirt, dust or other contaminants that may build up internal to the connector and effect performance. Indeed, the methodology may also be applied to hybrid connectors that include both optical and electrical connections.

Figure 1:
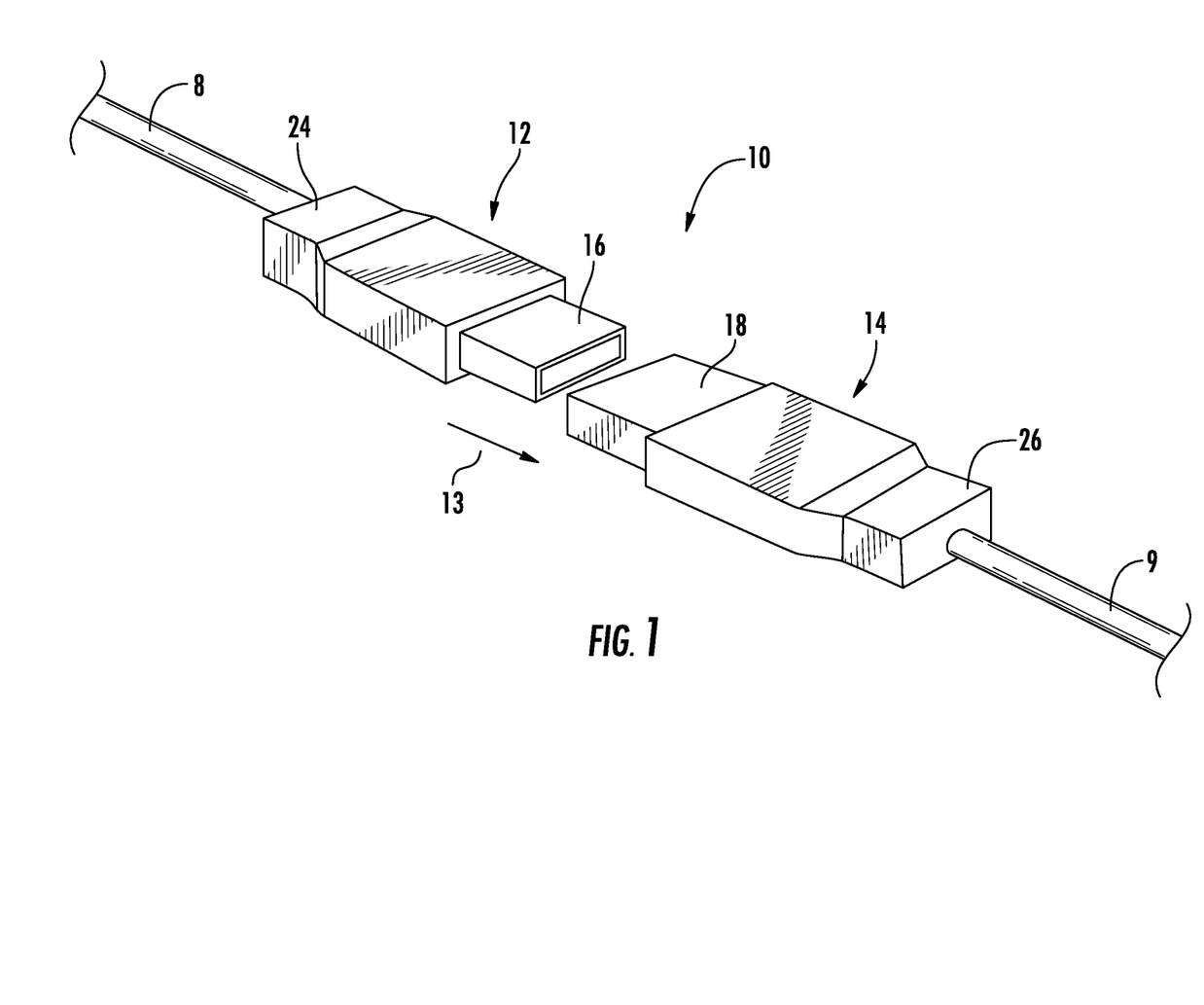
FIG. 1 is an isometric view of a typical optical connector used in the consumer electronic industry, which may be a USB connector in this exemplary embodiment.
Figure 2:
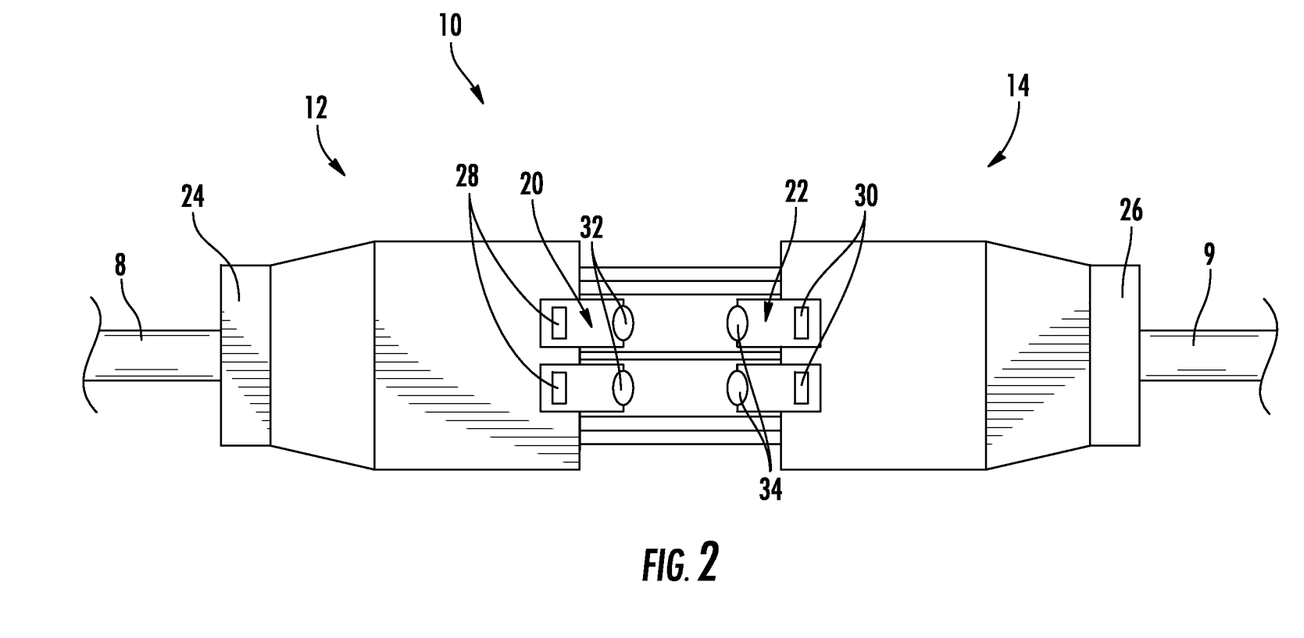
FIG. 2 is a schematic cross sectional view of the optical connector of FIG. 1.

FIGS. 1 and 2 are an isometric view and a schematic cross sectional view, respectively, of a typical consumer electronic optical USB connection 10 showing a male connector 12 and a female connector 14. FIG. 1 shows a condition in which the male connector 12 and the female connector 14 are disconnected. By inserting the male connector 12 into the female connector 14 in the direction of an arrow 13, an optical connection is made between two fiber optic cables 8 and 9 that are terminated by the connectors 12,14. Alternatively, one of the connectors, usually the female may be a receptacle built into a component such as a computer or peripheral device.

The male connector 12 may include optical components 20 disposed within a case 16 and the female connector 14 may include optical components 22 disposed within a case 18. When the male connector 12 and the female connector 14 are connected together, the optical components 20 of the male connector 12 and the optical components 22 of the female connector 14 are opposed to and aligned with each other for proper transmission of data across the junction. Generally, the fiber optic connector 10 may transmit optical signals encoded with data in the single direction of the arrow 13 or, more likely, in both directions (bidirectional), by optical transmission. For example, a fiber optic cable 8 may be connected to a peripheral device (not shown) and a fiber optic cable 9 of connector 14 may be connected to a personal computer (not shown) or other suitable device in order to transmit data from the peripheral device to the personal computer/device and vice versa. Such optical transmission enables high-speed data communication rates of several tens to several hundreds times that of a conventional wire cable, thereby achieving, for example, data transmitting speeds of from about 100 megabits per second (Mbps) up to about 10 gigabits per second (Gbps).

The optical components 20 disposed in the male connector 12 may include, for example, a light emitting surface 28, and one or more lenses 32 or other optical components. The optical components 22 disposed in the female connector 14 may include, for example, a light receiving surface 30 and one or more lenses 34. The light receiving surface 30 may receive an optical signal from the light emission surface 28 through the lens 34 for transmission through the fiber optic cable 9. Although not illustrated, the connectors may further include other elements such as additional lenses, one or more mirrors, etc. as elements of the optical components. Given the large quantities of data transmitted by optical transmission, it is important that all the optical components of the connector (e.g. optical components 20, 22) are clean and free of contaminants, which at least includes dirt and dust.

Figure 3:
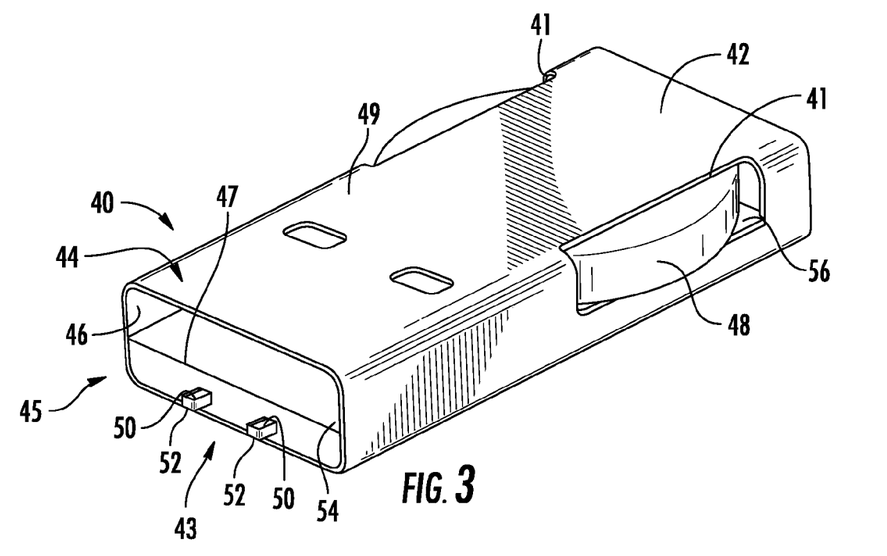
FIG. 3 is an isometric view of a cleaning tool according to an embodiment of the disclosure showing a detailed view of a cleaning tip.
Figure 4:
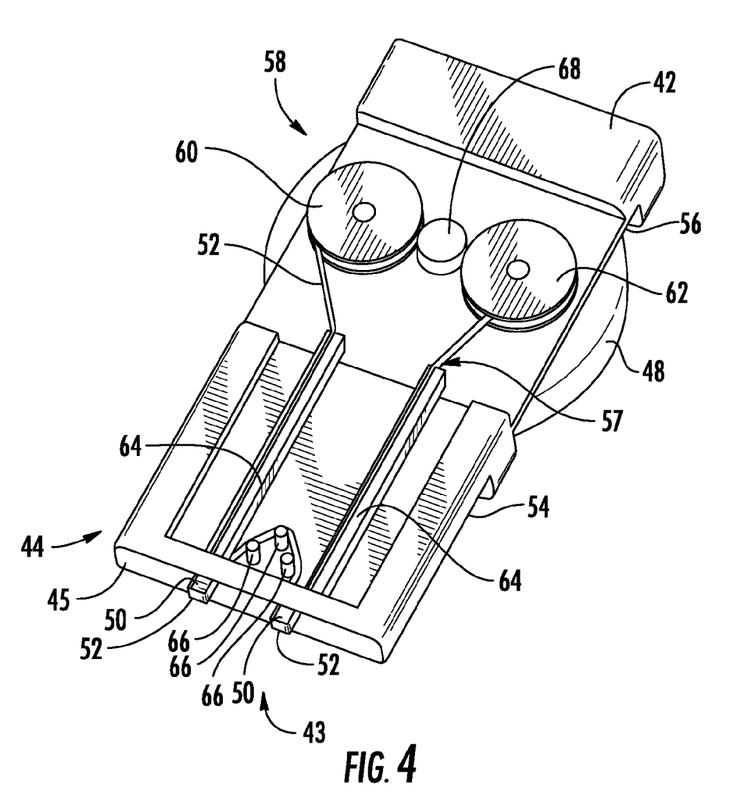
FIG. 4 is an isometric view of the cleaning tool of FIG. 3 showing the cleaning tip with a casing removed.

FIGS. 3 and 4 are isometric views of a fiber optic connector cleaning tool 40 according to an embodiment of the disclosure. In one embodiment, the cleaning tool 40 may include a tool body 42 comprising a cleaning tip 43 which projects from a distal end portion 45 of the tool body 42. As illustrated, the tool body 42 is generally prismatic in shape, but may have any suitable shape. The shape of the tool body 42 may depend in part on facilitating handling and use of the tool 40 by a technician. An edge 47 of the cleaning tip 43 may form a portion of a channel 46 that receives at least a portion of either the male connector 12 or the female connector 14. The channel 46 may be further defined by a shelf 54 and a portion of the body 42. The channel 46 at least functions to guide and support the male connector 12 or a female connector 14 into position to be cleaned. Additionally, the channel 46 may in part function to align the optical components 20, 22 of the connector 12, 14 with the cleaning tip 43. The cleaning tip 43 may configured to be received by either a male connector 12 or the female connector 14. The cleaning tip 43 also provides a location on the cleaning tool 40 where the a cleaning strip 52 may be exposed and contact and wipe the optical components 20, 22 free of contaminants. The cleaning tool 40 further comprises a drive 48 that forms a portion of a drive mechanism 58 for the cleaning tool 40. The drive 48 may be partially exposed through openings 41 that establish a recessed area 56 within a casing 49 of the body 42 in order to facilitate user access to the drive 48. In some embodiments, the drive 48 may be a thumb wheel; but, other suitable drives are possible.

A pair of protrusions 50 extend from an end wall of end portion 45 at the distal end 44 of the cleaning tip 43. The protrusions 50 at least function to guide and urge the cleaning strip 52 into contact with optical surfaces of the respective optical components 20, 22. The protrusions 50 may also function to align the cleaning strip 52 with the optical components 20, 22 of respective connectors 12, 14 in order to wipe and remove contaminants from the optical surfaces. Although this embodiment is depicted as having a pair of protrusions 50, some embodiments may only require a single protrusion 50. The optical surfaces may include the exposed surfaces of the lenses 32, 34 (see FIG. 2). The cleaning strip 52 (as well as cleaning strip 152, as seen in FIGS. 8-13) may be a strip of micro-denier cleaning material, a relatively low lint and highly absorbent material, or a yarn material that may be used either wet or dry. Generally, the cleaning strip 52 will have two sides and each side of the cleaning strip 52 can be used to clean and wipe the optical surfaces. In this embodiment, rotating the drive 48 will advance the cleaning strip 50 to wipe the optical surface. The cleaning strip 52 may move in a direction parallel with the edge 47 of the cleaning tip 43 when advancing from a supply reel 60 to a take up reel 62. The cleaning strip 52 may move in a different direction (i.e. not parallel to edge 47) and the direction may depend on the geometry and configuration of a drive mechanism 58.

In FIG. 4, the casing 49 of the cleaning tool 40 has been removed in order to show the cleaning tip 43 and the exemplary drive mechanism 58 in greater detail. The drive mechanism 58 may include the supply reel 60 and the take up reel 62. The supply reel 60 holds a quantity of the cleaning strip 52 and the take up reel 54 receives the cleaning strip 52 after it has passed the optical surface and wiped the optical surface. A drive element 68 may also be part of the drive mechanism 58 and assist in advancing the cleaning strip 52 along a cleaning strip path 57 or path 57. The drive element 68, as illustrated, is a drive wheel that contacts both the supply reel 60 and the take up reel 62 such that when the drive element 68 rotates, the supply reel 60 and the take up reel 62 also rotate. The drive element 68 may be directly or indirectly in communication with the drive 48 such that rotation of the drive 48 will cause the drive element 68 to rotate. In this particular embodiment, the cleaning strip path 57 is comprised of guide channels 64 and guide elements 66 and the cleaning strip path 57 may be either continuous or intermittent, depending on the particular application. The protrusions 50 and drive mechanism 58 may also be considered as a portion of the cleaning strip path 57. The guide channels 64 and guide elements 66 function to direct and control travel of the cleaning strip 52. Collectively, the guide channels 64 and guide elements 66 may be considered as guiding features. The path 57 illustrated in this embodiment is but one of a number of acceptable cleaning strip paths that will satisfy the minimum requirement that the path 57 direct the cleaning strip 52 from the supply reel 60, into contact with the optical surface or surfaces to be cleaned and to the take up reel 62. Further, as previously mentioned, the cleaning strip 52 may be a two sided cleaning strip 52 and such a cleaning strip path 57 and drive mechanism 58 as illustrated will bring only one of the two sides of the cleaning strip 52 into contact with the optical surface in order to clean the optical surface. Further, tools disclosed herein can be configured so that the cleaning strip 52 and/or supply/take-up reels can be replaced with new components after being used, thereby making the tool reusable instead of disposable.

Figure 5:
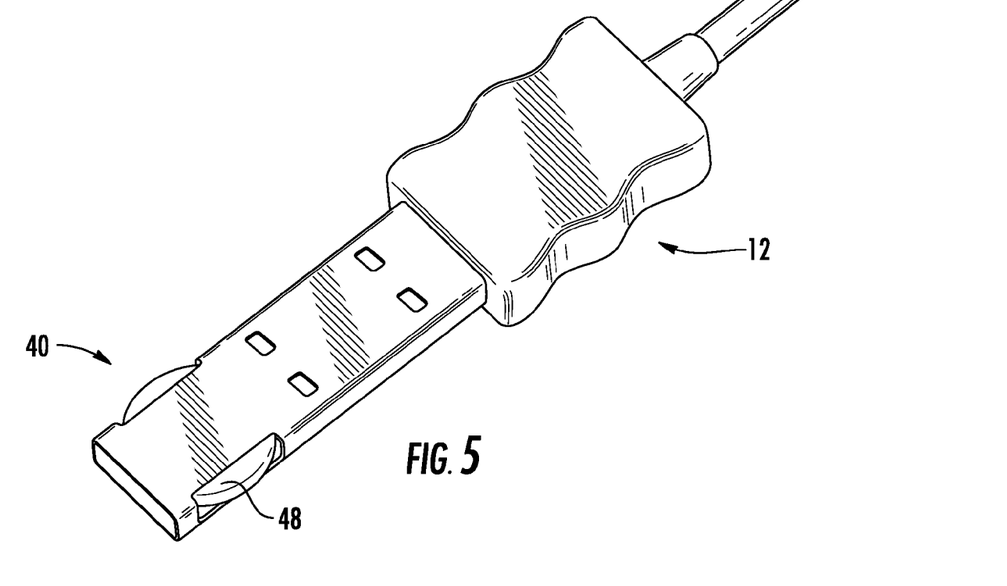
FIG. 5 is an isometric view of the cleaning tool of FIG. 3 showing the cleaning tip inserted within a male optical connector, in this example a USB connector.
Figure 6:
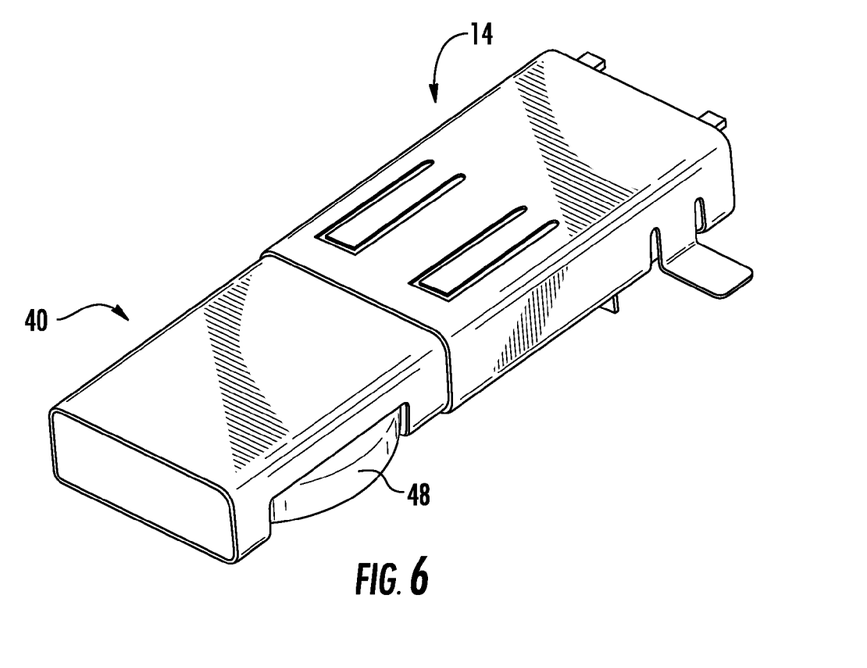
FIG. 6 is an isometric view of the cleaning tool of FIG. 3 showing the cleaning tip inserted within a female optical connector, in this example a USB connector.

FIG. 5 is an isometric view of the cleaning tool of FIG. 3 showing the cleaning tip 43 inserted within a male optical connector 12 and FIG. 6 is an isometric view showing the cleaning tip 43 inserted within a female optical connector 14. In this example, the connectors 12, 14 are shown as USB style optical connectors, but the concepts disclosed herein may be used with other connectors having deeply buried, highly shrouded, and/or shuttered optical components. Thus, the cleaning tool 40 is intended for use with any optical connector and should not be construed as being limited to a USB optical connector. With the cleaning tool 40 properly attached to a respective connector 12, 14, rotation of the drive 48 will advance the cleaning strip (not visible) in order to clean the optical surfaces. Moreover, the cleaning tool 40 may have a cleaning tip for cleaning one or more surfaces on the respective connectors 12,14 such as cleaning a first surface and a second surface that are spaced apart.

Figure 7:
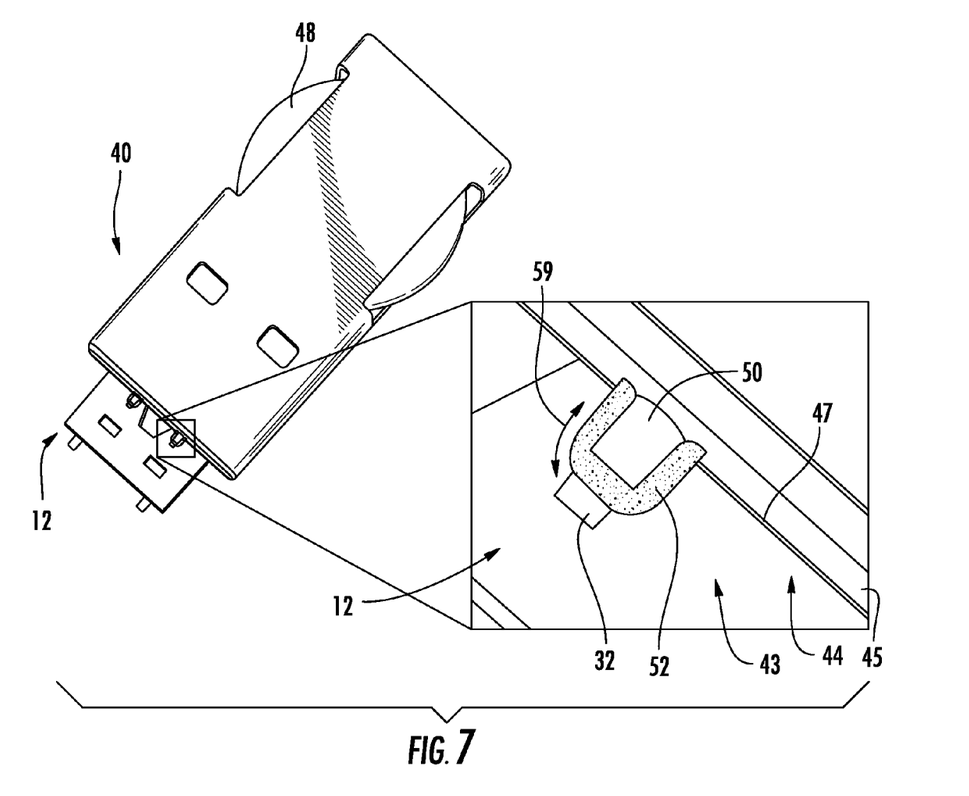
FIG. 7 is an isometric view of the cleaning tool of FIG. 3 showing the relationship of the cleaning tip to internal optical components of an optical connector within which the tip is inserted.

FIG. 7 is an isometric view of the cleaning tool 40 of FIG. 3 showing the relationship of the cleaning tip 43 and cleaning strip 52 to the internal optical component 32 of an optical connector 12 within which the cleaning tip 43 is inserted. For the purposes of clarity only a portion of connector 12 is shown in FIG. 7. In particular, it can be seen more clearly the relationship of the cleaning strip 52 with the optical component 32. The protrusion 50 urges one side of the cleaning strip 52 into contact and wipes the optical component 32 clean by removing contaminants. It can be seen that the cleaning strip 52 advances in a direction 59 parallel with the edge 47 of the cleaning tip 43 and the direction may be bi-directional. The cleaning strip 52 is advanced along the cleaning strip path 57 (see FIG. 4) by turning or rotating the drive 48.

Figure 8:
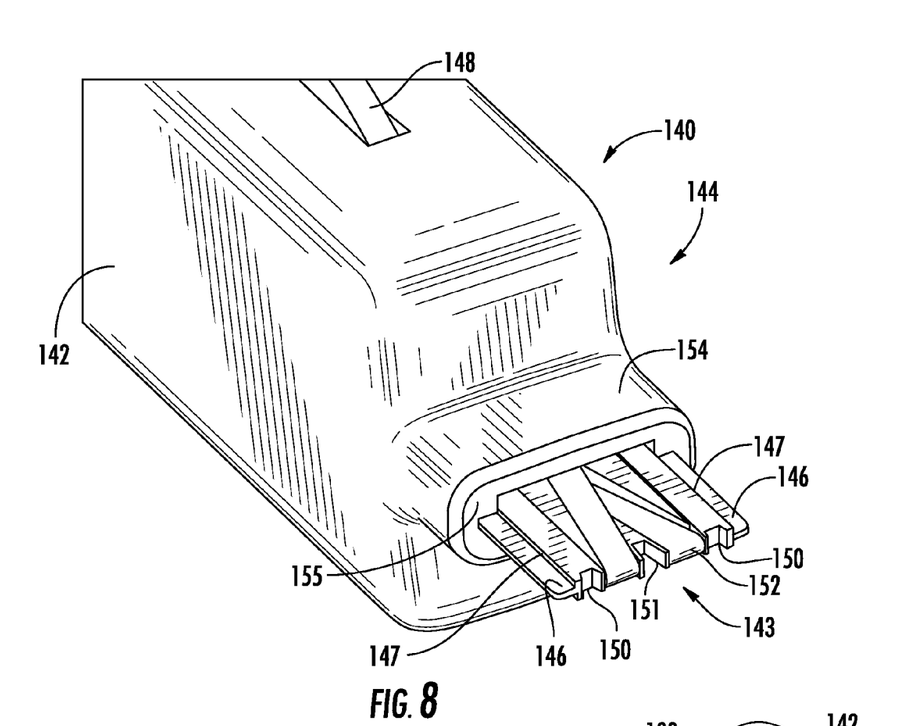
FIG. 8 is an isometric view of a cleaning tool according to another embodiment showing a view of a cleaning tip and distal end of the tool.
Figure 9:
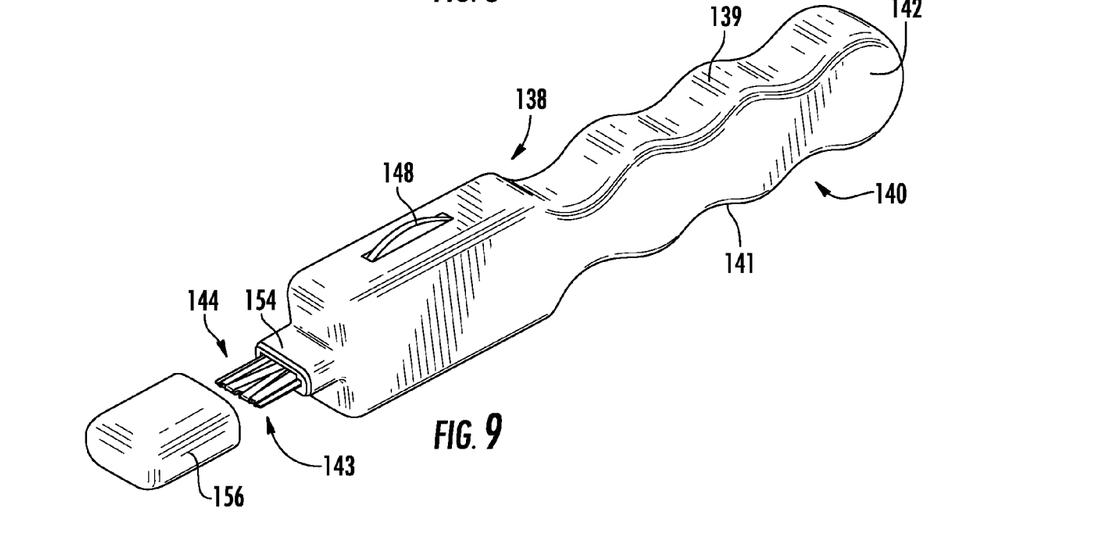
FIG. 9 is an isometric view of the cleaning tool of FIG. 8.

FIGS. 8 and 9 are isometric views of a cleaning tool 140 according to another embodiment. The cleaning tool 140 may comprise a tool body 142 having a cleaning tip 143 arranged proximate a distal end 144 and a tool handle 139 arranged toward a proximal end 138. The tool body 142 may also comprise a tool grip 141 that may be arranged along the tool handle 139. The tool grip 141 may facilitate handling and articulation of the cleaning tool 140 when attaching the tool 140 to a connector. The cleaning tool 140 may also comprise a drive 148, similar in function to the drive 48 discussed herein in connection with FIGS. 3-7. A hub 154 extends from the tool body 140 and the cleaning tip 143 may extend from the hub 154. The hub 154 may receive a cap 156 to cover, keep clean, and protect the cleaning tip 143 when the cleaning tool 140 is not in use.

Figure 10:
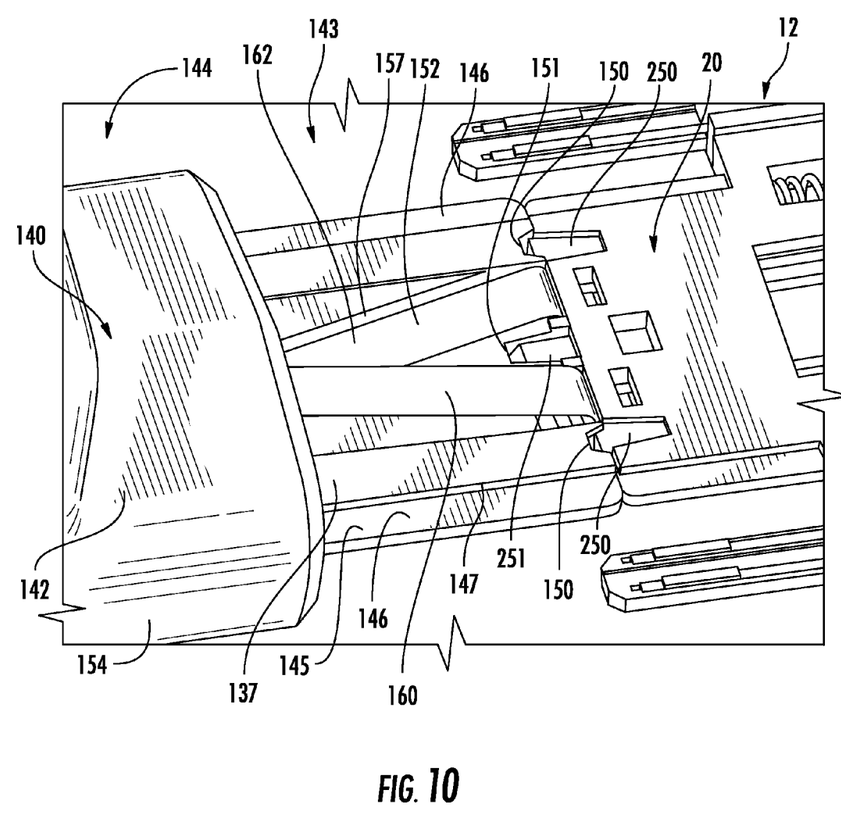
FIG. 10 is an isometric view of the cleaning tool of FIG. 8 and showing a detailed view of the cleaning tip arranged proximate an optical connector.
Figure 11:
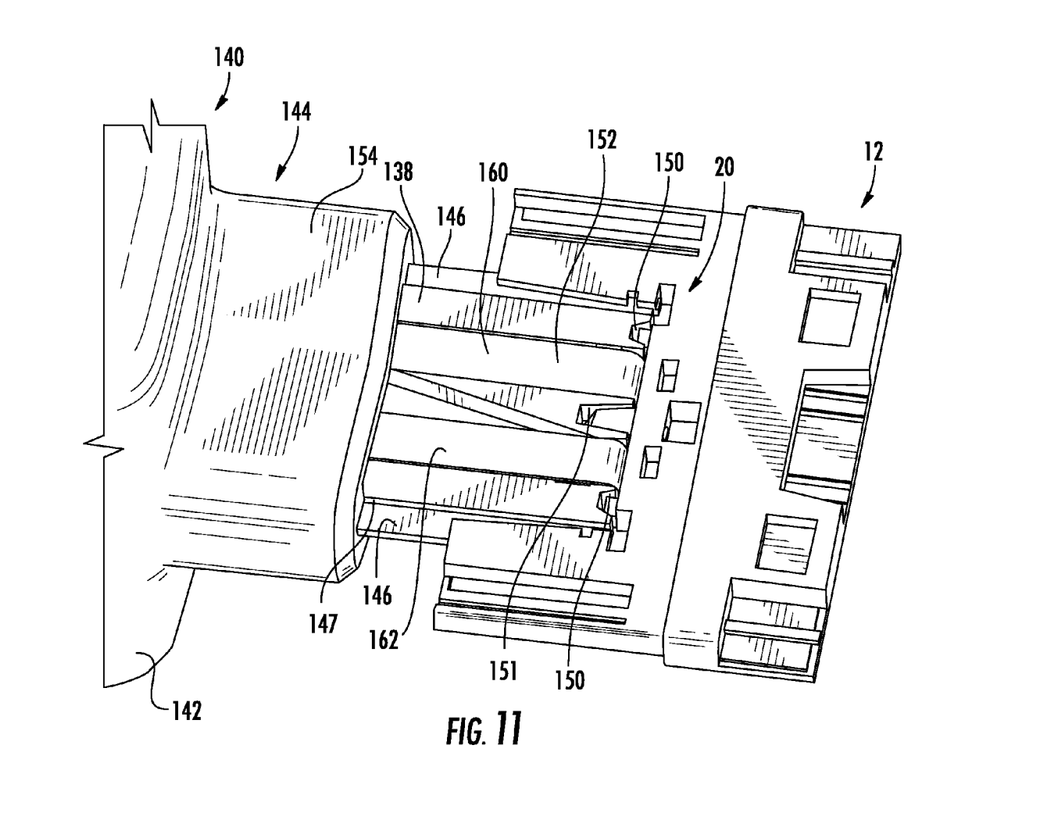
FIG. 11 is an isometric view of the cleaning tool of FIG. 8 and showing a detailed view of the cleaning tip arranged proximate an optical connector.

The cleaning tip 143 can be seen in greater detail in FIGS. 10 and 11 and is illustrated engaged with an end of an optical connector 12. With reference to FIGS. 8-11, the cleaning tip 143 has a generally planar cleaning tip body 145 that extends from an end of the hub 154. The cleaning tip 143 may comprise at least one element to ensure proper alignment of a cleaning strip 152 with at least one surface of at least one optical component of the connector. Alignment features may include at least one alignment guide 146 arranged toward a side of the cleaning tip body 145, at least one alignment feature 150, and/or a central alignment feature 151. The alignment guide 146 may be located on a side or edge of the cleaning tip body 145 and there may be a step 147 from an upper surface of the cleaning tip body 145 to the alignment guide 146. FIG. 11 is an alternate view of the cleaning tip 143 and shows more clearly the alignment guide 146 engaged with the optical connector 12. In this embodiment, the alignment guide 146 interfaces with a channel on the optical connector 12 and slides into position with the cleaning strip 152 positioned to wipe an optical surface. The alignment guide 146 in part aligns the optical surfaces of the connector 12 with the cleaning strip 152 of the cleaning tool 140 so the optical surfaces may be cleaned. The alignment guide 146 may also increase the rigidity of the joint (i.e. the alignment guide 152 and the channel on the connector 12).

The alignment features 150 and central alignment feature 151 may be notches arranged toward the end of the cleaning tip 143 and are sized and configured to engage with elements, profiles or features of the optical connector 12. For example, as illustrated in FIG. 10, the optical connector 12 may have protrusions 250, 251 that engage with the cleaning tip body 143 when the cleaning tool is 140 moved into position with the connector 12. The alignment features 150, central alignment feature 151 and alignment guides 146 may function individually or collectively to align the cleaning strip 152 of the cleaning tip 153 with the optical components to be cleaned.

Figure 12:
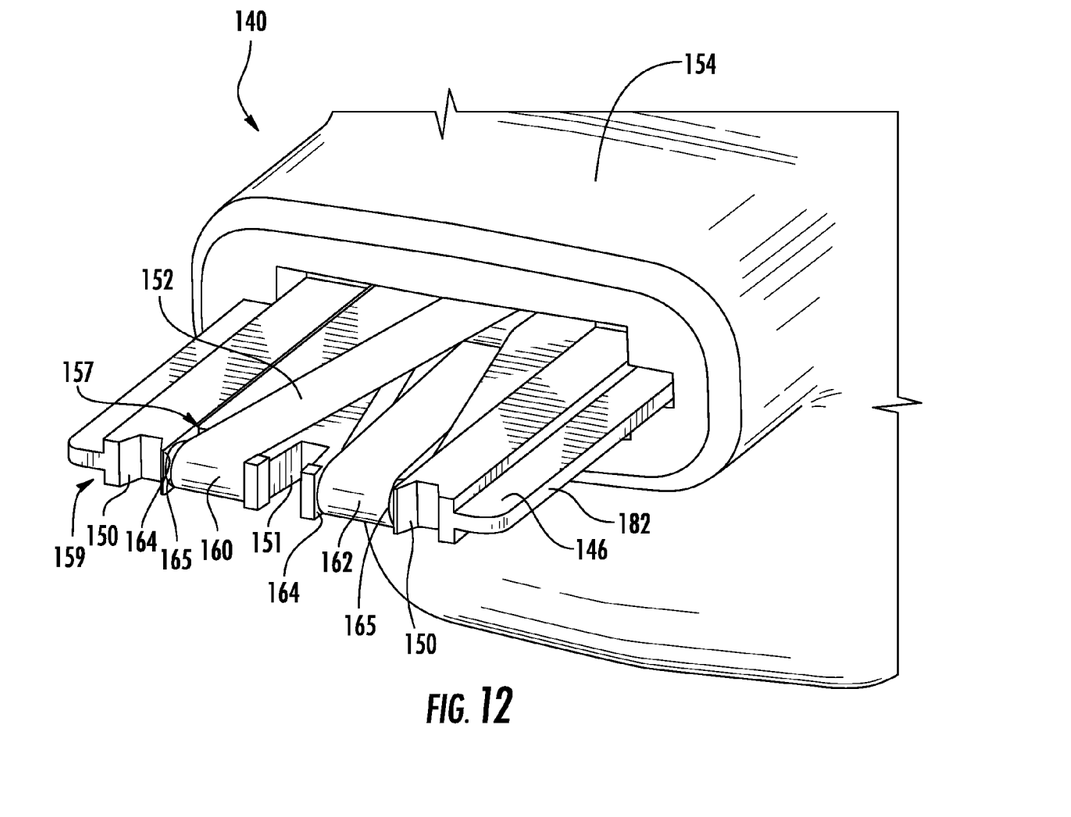
FIG. 12 is a detailed isometric view of the cleaning tool of FIG. 8 showing the cleaning tip along with the cleaning strip path.
Figure 13:
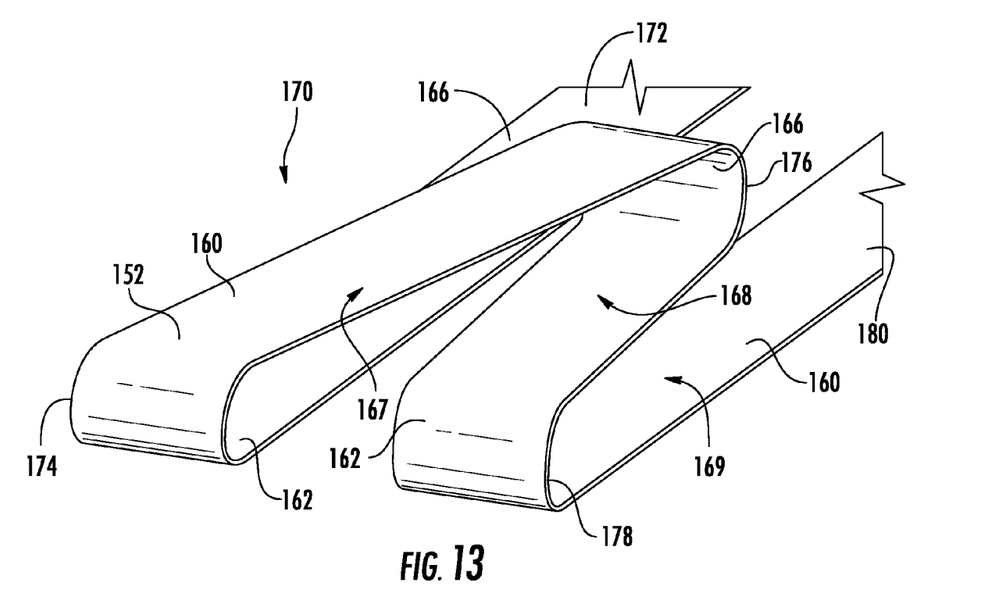
FIG. 13 is a view of a cleaning strip along the cleaning strip path with the cleaning tool of FIG. 8 removed.

The cleaning tip 143 partially exposes one or more portions of the cleaning strip 152 that advances along a cleaning strip path 157. The cleaning strip path 157 may be both internal and external to the tool body 142 and directs the cleaning strip 152 into contact with the optical surfaces in order to clean the surfaces. The cleaning strip is advanced along the cleaning strip path 157 by a drive mechanism (not visible) that may be similar to other drive mechanisms disclosed herein. The drive mechanism may be considered to be an element of the cleaning strip path 157. The drive mechanism may at least comprise the drive 148, a supply reel and a take up reel. The supply reel and take up reel may either be internal to the body 142 or external to the body 142 and depend upon the configuration of the drive mechanism. For this particular embodiment, rotating the drive 148 will advance the cleaning strip 152 along the cleaning strip path 157. A plurality of guides urge the cleaning strip 152 to remain on the cleaning strip path 157. The guides may be defined by channels, recesses, walls or barriers and may be arranged in the cleaning tip 143, the interior of the hub 154, and/or the interior of the body 142, if necessary. The guides may be fabricated to be positioned within the cleaning tool 140 or added as a separate component to the cleaning tool 140 where required. The guides at least function to control the location of the cleaning strip 152 relative to the cleaning strip path 157 as it advances. As most clearly seen in FIG. 12, guides 164 are illustrated as channels arranged near a cleaning tip end 159. Additional guides, such as curved surfaces 165, are also near the cleaning tip end 159 and at least function to direct the cleaning strip 152 as it advances along the cleaning strip path 157. With reference to FIGS. 12 and 13, it is understood that a cylindrical guide may be arranged at turning location 166 of the cleaning strip path 157. The cylindrical guide may facilitate articulation of the cleaning strip 152. In some embodiments, the drive 148 may rotate the cylindrical guide in order to advance the cleaning strip 152.

The cleaning strip 152 may be a two-sided cleaning strip 152 having a first side 160 and a second side 162 and the tool may present both sides of cleaning strip 152 for cleaning two different portions of the respective connector with a fresh portion of the cleaning strip 152. In some embodiments, the cleaning strip path 157 and drive mechanism may advance and guide the first side 160 of the cleaning strip 152 into contact with a first optical surface and the second side 162 of the cleaning strip 152 into contact with a second optical surface. Simply stated, in order for both sides 160, 162 to be utilized during a single advance, the first side 160 of the cleaning strip 152 must be rotated or articulated after contacting and cleaning the first optical surface so the second side 162 may be may contact and clean the second optical surface.

Figure 14:
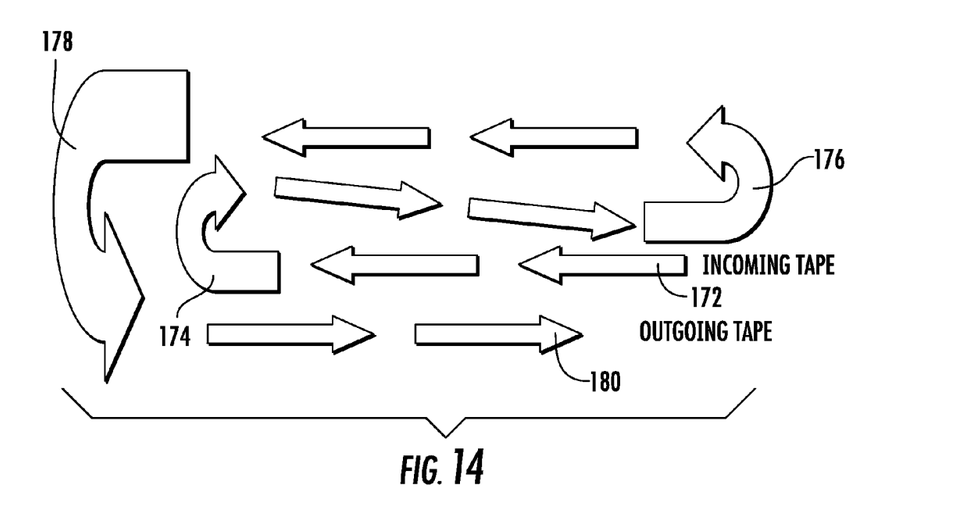
FIG. 14 is a schematic drawing of the motion and direction of the cleaning strip as it is advanced along the cleaning strip path.

FIG. 13 shows a cleaning strip path configuration 170 of the cleaning strip 152 with the cleaning strip path 157 with the cleaning tool 140 removed for clarity. FIG. 14 is a schematic drawing of the motion and direction of the cleaning strip 152 as it advances along the cleaning strip path 157. The arrows of FIG. 14 illustrate the direction of travel of the cleaning strip 152. As the cleaning strip 152 is advanced, the first side 160 of the cleaning strip 152 will contact the first optical surface and the second side 162 of the cleaning strip 152 will contact the second optical surface. The cleaning strip 152 moves along a first portion 166 of the cleaning strip path 157 at or near location 172 of the path 157 after being supplied by the supply reel. The cleaning strip 152 advances along the first portion 166 to a first turn 174, which is where the first side 160 of the cleaning strip will contact the first optical surface. Once past the first turn 174, the cleaning strip 152 advances along a second portion 167 of the cleaning strip path 157 toward a second turn 176. At the second turn 176, the second side 162 of the cleaning strip 152 becomes the side facing the second optical surface. This is accomplished by turning the cleaning strip 152 to permit the first side 160 and the second side 162 to change position relative to the optical surfaces. The cleaning strip 152 advances from the second turn 176 and travels along the third portion 168 to the third turn 178, where the second side 162 of the cleaning strip 152 is brought into contact with the second optical surface. After contacting and cleaning the second optical surface, the cleaning strip 152 completes travel around the third turn 178 and advances along a fourth portion 169 and moves past location 180 and toward the take-up reel. Travel of the cleaning strip 152 past the optical surfaces, in order to clean the optical surface, is in a direction perpendicular to an edge 182 (See FIG. 12) of alignment guide 146. Other cleaning strip path configurations 170 may be possible for advantageously presenting the first side 160 of the cleaning strip 152 to clean at least a first optical surface and then presenting the second side 162 of the cleaning strip 152 for cleaning at least a second optical surface.

The cleaning tool 40, 140 may be fabricated from any material that is suitable but it is preferable the tool 40, 140 be fabricated from a material that may be injection molded, such as a polymeric material or an elastomeric material. Further, any fabrication process or technique may be used to produce or manufacture the tool 40, 140.

It will be apparent to those skilled in the art that various modifications and variations can be made without departing from the spirit and scope of the invention exemplified herein, which is limited only by the claims.

What is claimed is:

1. A tool for cleaning at least one surface within a consumer electronics connector, the tool comprising:
   a body;
   a cleaning tip on the body, the cleaning tip having a distal end portion and being configured to be received by the connector, the distal end portion configured to align the at least one surface with the cleaning tip;
   a strip of cleaning material disposed in the tool and extending along a path that exposes the strip of cleaning material at the distal end portion of the cleaning tip for engaging a first surface and a second surface when the cleaning tip is received by the connector; and
   a mechanism in the tool for selectively advancing the strip of cleaning material along the path to wipe contaminates from the first surface and the second surface when the cleaning tip is received by the connector, wherein the mechanism for selectively advancing the strip of cleaning material along the path such that a first side of the strip wipes contaminates from the first surface and after turning the strip of cleaning material along a portion of the path a second side of the strip wipes contaminates from the second surface.

2. The tool of claim 1, wherein the path exposes the strip of cleaning material at the distal end portion of the cleaning tip for engaging the first surface and the second surface that are spaced apart.

3. The tool of claim 1, wherein the path comprises a plurality of guiding features that position the first side of the strip for engagement with the first surface and the second side of the strip for engagement with the second surface.

4. The tool of claim 1, wherein the cleaning tip projects from the body.

5. The tool of claim 1, wherein the strip of cleaning material comprises a micro denier cleaning material.

6. The tool of claim 1, wherein the strip of cleaning material comprises a relatively low lent and relatively highly absorbent material.

7. The tool of claim 1, wherein the strip of cleaning material is a yarn that is used either wet or dry.

8. The tool of claim 1, wherein the mechanism for advancing the strip of cleaning material comprises a supply reel and a take-up reel and a drive for rotating one or both of the reels.

9. The tool of claim 8, wherein the drive comprises a thumb wheel.

10. The tool of claim 1, wherein the exposed strip of cleaning material advances in a direction substantially perpendicular to the distal end of the cleaning tip.

11. The tool of claim 1, wherein the path is a continuous path.

12. The tool of claim 1, wherein the distal end is configured with at least one alignment feature to align the cleaning strip with the first surface.

\* \* \* \* \*